US011480311B2

(12) United States Patent
Beauchamp et al.

(10) Patent No.: US 11,480,311 B2
(45) Date of Patent: Oct. 25, 2022

(54) FIBER OPTIC PANEL APPLIQUE

(71) Applicant: Valeo North America, Inc., Troy, MI (US)

(72) Inventors: Jon Beauchamp, Seymour, IN (US); John Orisich, Seymour, IN (US)

(73) Assignee: Valeo North America, Inc., Troy, MI (US)

(*) Notice: Subject to any disclaimer, the term of this patent is extended or adjusted under 35 U.S.C. 154(b) by 0 days.

(21) Appl. No.: 17/508,125

(22) Filed: Oct. 22, 2021

(65) Prior Publication Data
US 2022/0074569 A1 Mar. 10, 2022

Related U.S. Application Data

(63) Continuation of application No. 16/552,582, filed on Aug. 27, 2019, now Pat. No. 11,187,395.

(51) Int. Cl.
*F21S 43/245* (2018.01)
*F21S 43/237* (2018.01)
*F21S 43/247* (2018.01)
*F21S 43/14* (2018.01)
*F21S 43/243* (2018.01)
*F21W 103/20* (2018.01)
*F21W 107/10* (2018.01)

(52) U.S. Cl.
CPC ............. *F21S 43/245* (2018.01); *F21S 43/14* (2018.01); *F21S 43/237* (2018.01); *F21S 43/243* (2018.01); *F21S 43/247* (2018.01); *F21W 2103/20* (2018.01); *F21W 2107/10* (2018.01)

(58) Field of Classification Search
CPC ........ F21S 43/245; F21S 43/14; F21S 43/237; F21S 43/243; F21S 43/247; F21S 43/26; F21S 43/40; F21S 43/239; F21S 43/251; F21S 43/31; F21W 2103/20; F21W 2107/10; B60Q 1/2607; B60Q 1/30; B60Q 1/0011; G02B 6/0008; G02B 6/001
See application file for complete search history.

(56) References Cited

U.S. PATENT DOCUMENTS

| 4,961,617 | A | * | 10/1990 | Shahidi | ................... G09F 9/305 362/330 |
| 4,977,487 | A | | 12/1990 | Okano | |
| 5,005,108 | A | | 4/1991 | Pristash et al. | |
| 5,222,793 | A | | 6/1993 | Davenport et al. | |
| 5,311,410 | A | | 5/1994 | Hsu et al. | |
| 5,709,453 | A | | 1/1998 | Krent et al. | |

(Continued)

*Primary Examiner* — Tsion Tumebo
(74) *Attorney, Agent, or Firm* — Valeo North America, Inc.

(57) ABSTRACT

A lighting apparatus includes a plurality of fiber optic panels coupled to respective light sources. The fiber optic panels include a set of optical fibers configured to emit light transversely to the optical axis thereof to form respective illumination regions in the fiber optic panels. A housing is included in the lighting apparatus to have an internal chamber and at least one window formed therein by which the internal chamber is in optical communication with the exterior of the housing. Additionally, an optical system such as a reflector or lens can subtend the light from the distal ends of the fibers within the chamber. Fiber optic panels are optically coupled to the housing assembly to convey light into the internal chamber while the illumination regions extend from the housing to perform a lighting function of an automotive vehicle.

15 Claims, 8 Drawing Sheets

(56) References Cited

U.S. PATENT DOCUMENTS

| | | |
|---|---|---|
| 5,857,041 A | 1/1999 | Riser et al. |
| 6,244,734 B1 | 6/2001 | Hulse |
| 6,357,899 B1 | 3/2002 | Craven |
| 7,556,412 B2 | 7/2009 | Guillermo |
| 9,927,087 B1 | 3/2018 | Green et al. |
| 10,150,396 B2 | 12/2018 | Salter et al. |
| 2003/0179088 A1 | 9/2003 | Heller |
| 2012/0256543 A1 | 10/2012 | Marcove et al. |
| 2013/0039083 A1 | 2/2013 | Gong et al. |
| 2018/0094790 A1 | 4/2018 | Green et al. |
| 2018/0119919 A1 | 5/2018 | Baker |
| 2018/0142860 A1* | 5/2018 | Potter ................... F21S 43/243 |
| 2018/0299092 A1* | 10/2018 | Orisich ................. G02B 6/001 |

\* cited by examiner

FIBER OPTIC PANEL APPLIQUE

CROSS-REFERENCE TO RELATED APPLICATIONS

This application is a continuation of U.S. application Ser. No. 16/552,582, filed Aug. 27, 2019, the disclosure of which is hereby incorporated in its entirety by reference herein.

BACKGROUND

The use of fiber optic technology in automotive applications, e.g., lighting, sensing, communications, etc., has increased significantly over the last decade. Manufacturers use fiber optics for automotive lighting for a number of reasons, the most obvious of which is that optical fibers transmit "cold" light, making it a safe alternative to traditional sealed beam or halogen lighting. The light source in fiber optic automotive lighting is also typically easily accessible. Moreover, fiber optics allows for the light source to be considerably separated from the output location, thereby reducing the physical space requirements over many conventional lighting techniques.

Fiber optic panels are constructed from many optical fibers, at least some of which are configured to emit light transversely to their optical axes. This redirection of light as it passes within the fiber is not perfect, which results in some light emitting from the distal end of the fibers. Fiber optic panels can be formed into different shapes allowing lighting designers considerable freedom in their designs. Fiber optic panels are becoming more widely used as more diverse lighting configurations are implemented.

SUMMARY

A lighting apparatus includes a plurality of fiber optic panels coupled to respective light sources. The fiber optic panels include a set of optical fibers configured to emit light transversely to the optical axis thereof to form respective illumination regions in the fiber optic panels. A housing is included in the lighting apparatus to have an internal chamber and at least one window formed therein by which the internal chamber is in optical communication with the exterior of the housing. The fiber optic panels are coupled to the housing to convey light into the internal chamber while the illumination regions extend from the housing to perform a lighting function of an automotive vehicle.

DETAILED DESCRIPTION

Figure 1:
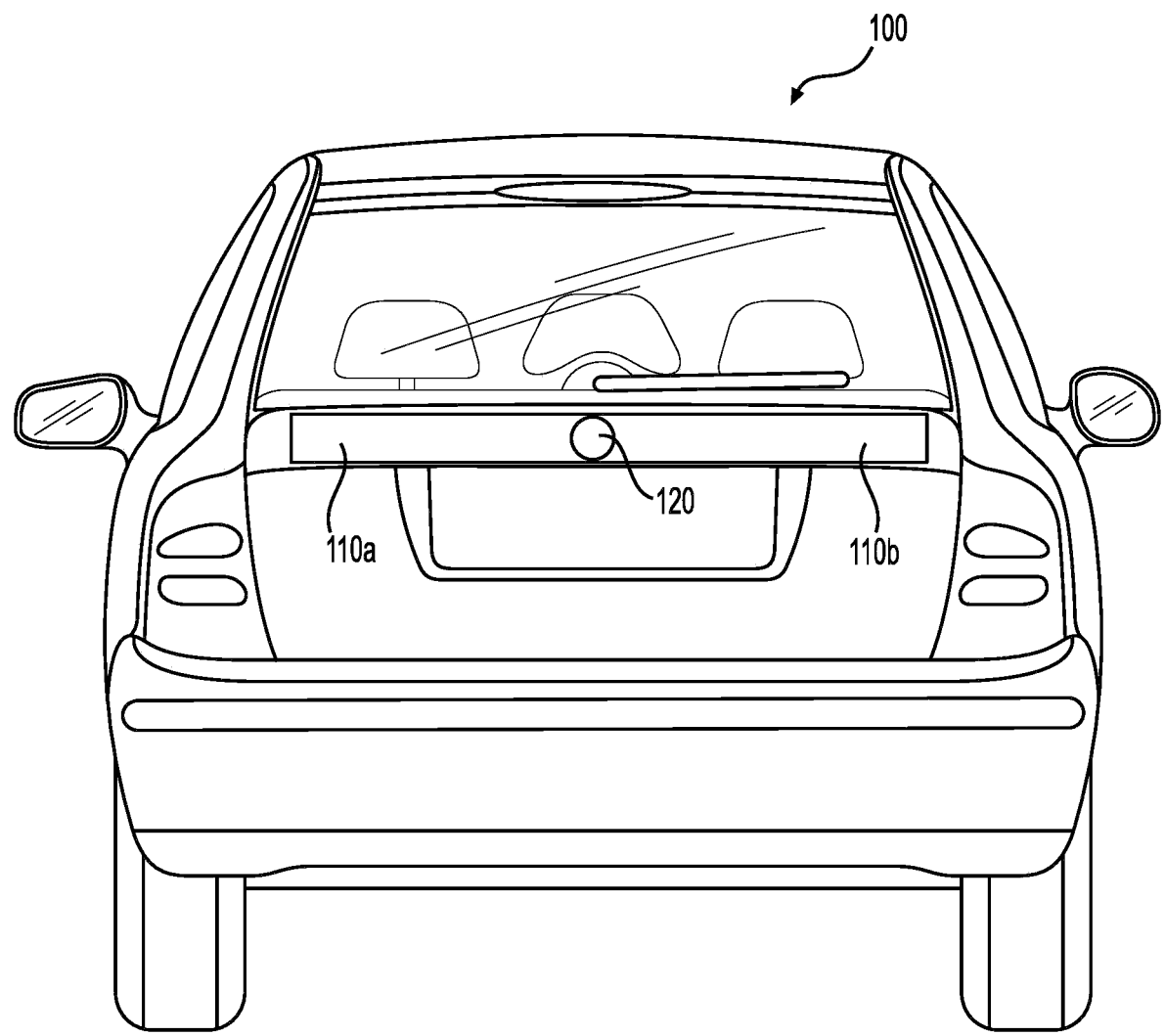
FIG. 1 is a diagram of a rear end of an automotive vehicle realizing an embodiment of the present invention.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

FIG. 1 is a diagram of a rear end of an automotive vehicle 100 realizing an embodiment of the present invention. As illustrated in the figure, vehicle 100 includes a lighting applique 105 that comprises a pair of fiber optic panels 110a and 110b, representatively referred to herein as fiber optic panel(s) 110, and an illuminated element 120. Applique 105 may perform an automotive lighting function, such as a taillight function or an auxiliary tail lighting function that is other than a taillight function. In certain embodiments, fiber optic panels 110 can be independently illuminated and, when so embodied, applique 105 may perform a turn signal function. The present invention is not limited to particular lighting functions; those having skill in the art will recognize numerous possible lighting configurations that can embody the present invention without departing from the spirit and intended scope thereof.

Figure 2A:
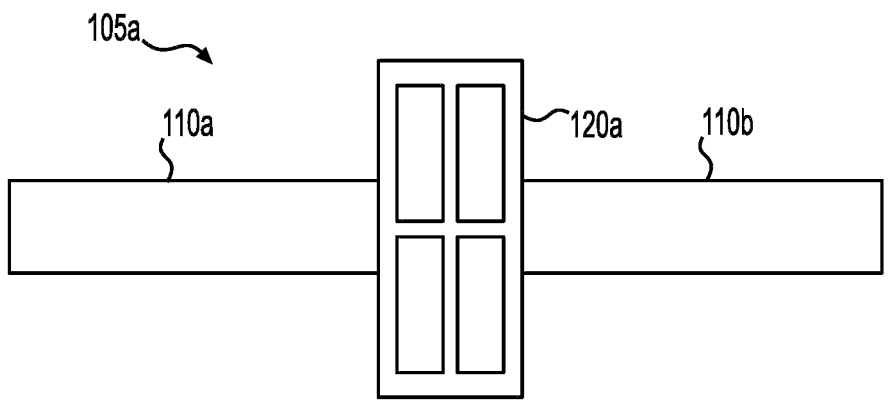
FIG. 2A and FIG. 2B depict alternative configurations of a lighting applique by which the present invention can be embodied.
Figure 2B:
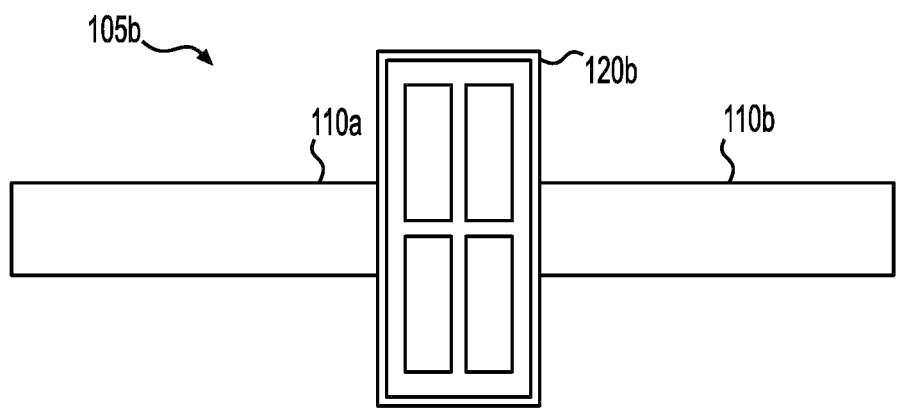

FIGS. 2A and 2B, collectively referred to herein as FIG. 2, depicts alternative configurations 105a and 105b, respectively, of lighting applique 105 illustrated in FIG. 1. Both lighting appliques 105a and 105b comprise fiber optic panels 110 on each side of illuminated elements 120a and 120b. Fiber optic panels 110 may be positioned behind illuminated elements 120a and 120b, as described in more detail below, to provide back illumination of the aesthetic elements. In the illustrated case, illuminated elements 120a and 120b are automotive logos, but, as will be apparent to those skilled in the art, embodiments of the invention can take on many different possible shapes.

Figure 3A:
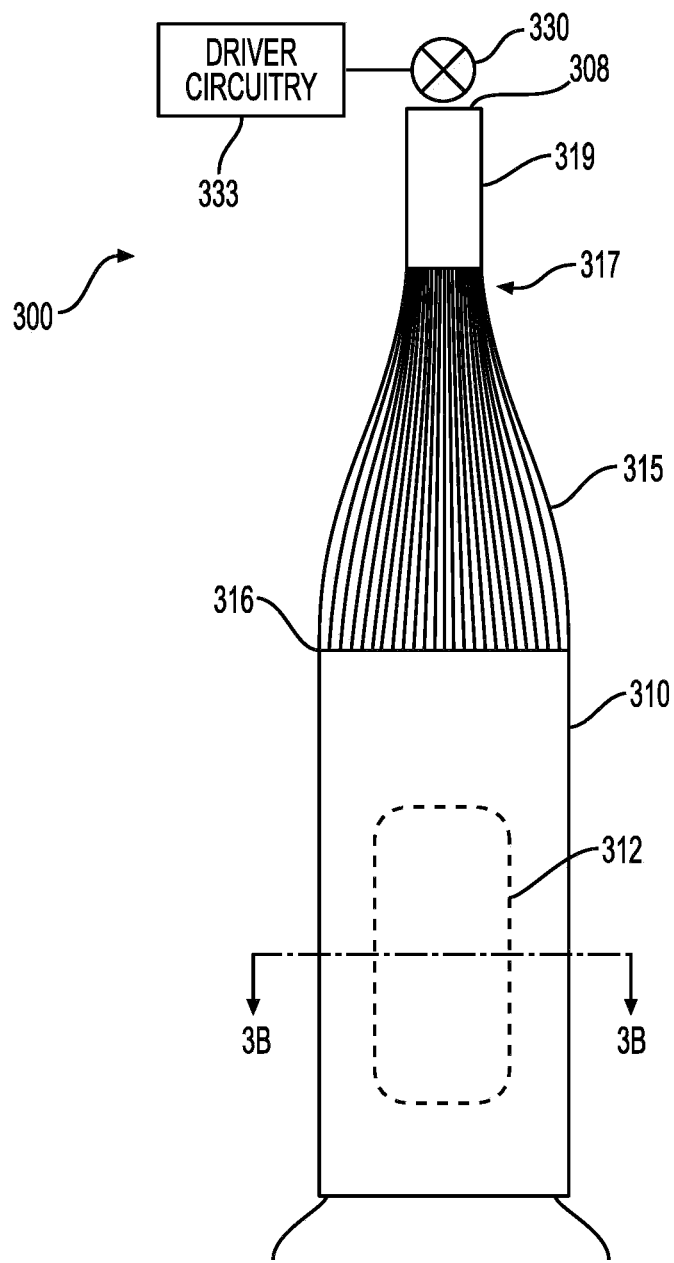
FIG. 3A and FIG. 3B are illustrations of an example fiber optic panel system by which the present inventive concept can be embodied.
Figure 3B:
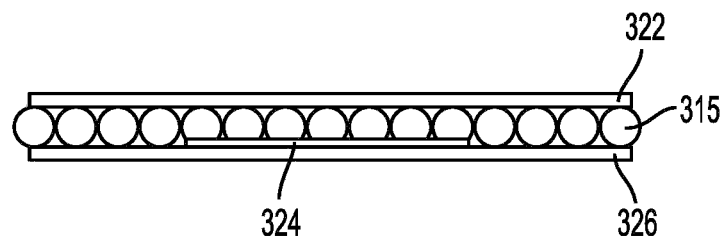

FIG. 3A and FIG. 3B, collectively referred to herein as FIG. 3, is an illustration of an example fiber optic panel system 300 with which the present invention can be embodied. Fiber optic panel assembly 300 comprises a plurality of optical fibers, representatively illustrated at optical fiber 315 and referred to herein as optical fiber(s) 315, assembled into a generally planar fiber optic panel 310. As is illustrated in FIG. 3B, fiber optic panel 310 may comprise a plurality of optical fibers 315 disposed on a backing 326 and overlaid with an optically transmissive medium or component 322. Backing component 326 may itself be transmissive, but may also be opaque or even reflective so as to facilitate illumination from the panel's face. Other components may be used as well in the construction of fiber optic panel 310, such as a fluorescent component 324, by which a color of the light from light source 330 is transformed.

Certain optical fibers 315 of fiber optic panel 310 may be constructed, treated, or otherwise configured to emit light transversely to their optical axes i.e., the line along the center of the optical fiber's core. The general construction of such a fiber optic panel is described in WO 2016/204779 A1, filed as PCT/US2015/036629 on Jun. 19, 2015 and entitled Fiber Optic Lighting and/or Signaling System for a Vehicle. WO 2016/204779 A1 is incorporated herein by reference in its entirety. Several of such treated optical fibers 315 may be positioned in fiber optic panel 310 to form an illumination region 312, from which light from light source 330 is emitted. It is to be understood that illumination region 312 may be of any shape and not just the generally rectangular shape exemplified in FIG. 3A. Additionally, illumination region 312 may encompass the entirety of fiber optic panel 310 or may be confined to a specific area on fiber optic panel 310.

In certain embodiments, optical fibers 315 are grouped into a fiber optic bundle 317, such as by way of a ferrule 319, for purposes of efficient optical coupling of optical fibers 315 to a common light source 330. The present invention is not limited to a particular light source 330; for purposes of explanation, light source 330 will be described herein as a light emitting diode (LED), although other light sources may be used without departing from the spirit and intended scope of the present invention. Fiber optic panel system 300 may include driver circuitry 333 suitable for providing sufficient electrical current to light source 330.

For purposes of description, optical fibers 315 are said to have an end proximal to the light source 330, referred to herein as the proximal end 308 of optical fiber(s) 315, and an end distal to the light source 330, referred to herein as the distal end 306 of optical fiber(s) 315. Accordingly, the ends of fiber optic panel 310 may be identified as a proximal end 316 and a distal end 318.

Figure 4A:
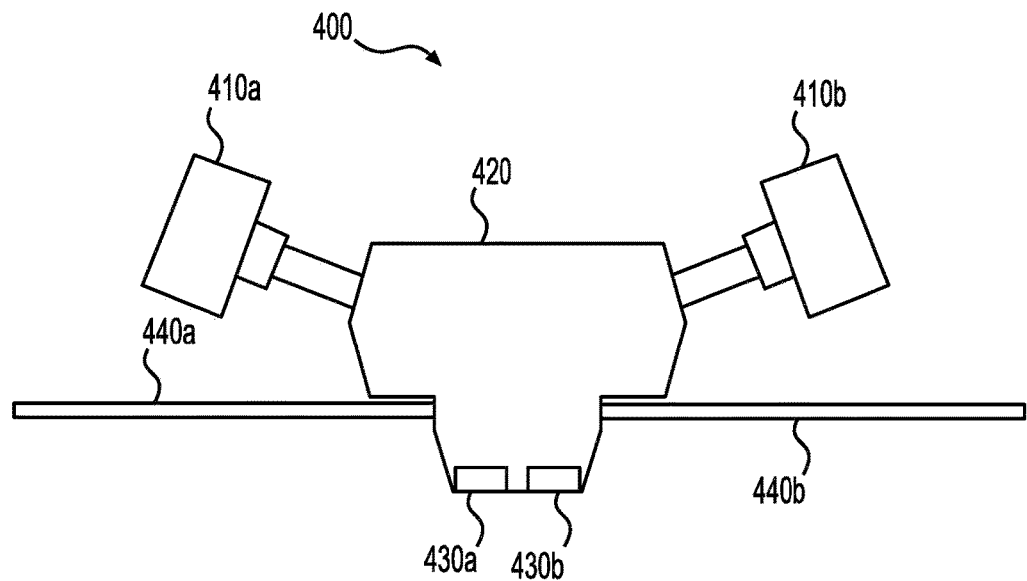
FIGS. 4A and 4B depict an applique by which the present invention can be embodied.
Figure 4B:
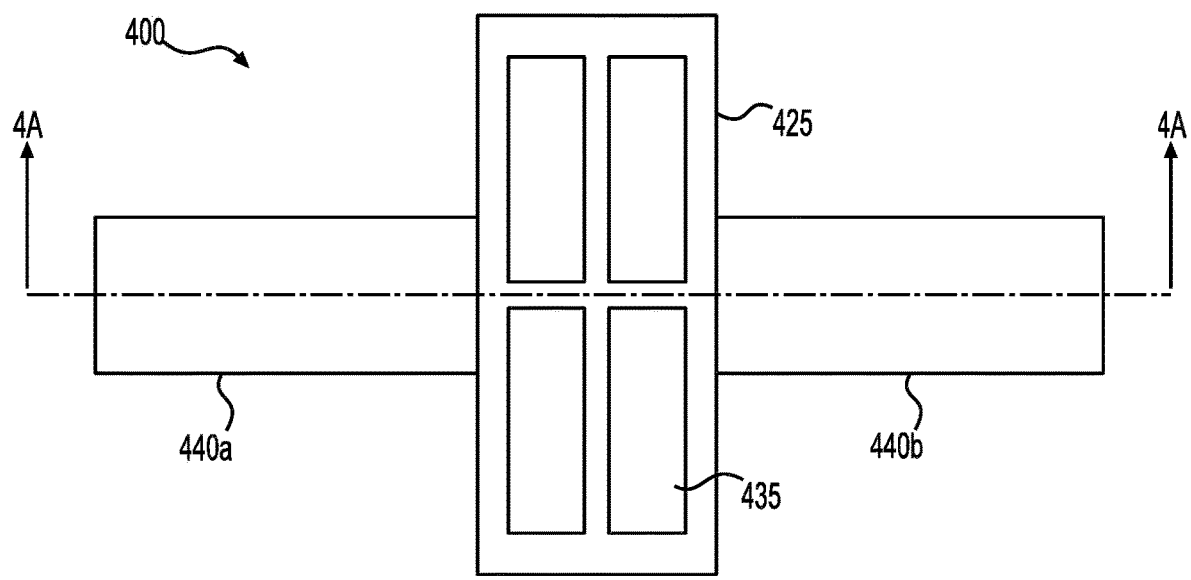

FIGS. 4A and 4B, collectively referred to herein as FIG. 4, depicts an applique 400 by which the present invention can be embodied. Example applique 400 includes a housing 420 on which the components of applique 400 are assembled, where such components include fiber optic panels 440a and 440b, representatively referred to herein as fiber optic panels 440, and an illuminated element 425. Fiber optic panels may be constructed in a manner similar to fiber optic panel system 300 of FIG. 3. Illuminated element 425 may be realized by windows 430a and 430b, representatively referred to herein as window(s) 430, which allow light from inside housing 420 to be communicated externally thereto.

Applique 400 includes light sources 410a and 410b, representatively referred to herein as light source(s) 410 that provide light to fiber optic panels 440. In certain embodiments, light sources 410 are mounted directly to housing 420. In other embodiments, light sources 410 may be mounted elsewhere, with light being carried to housing 420 by the fiber optic bundle of fiber optic panels 440. Fiber optic panels 440 may be provided to housing 420, by which illuminated element 425 is illuminated, and remaining lengths of fiber optic panels 440 may extend externally to housing 420. These remaining lengths may be affixed to an automotive vehicle to perform a lighting function, such as a taillight function or an auxiliary tail function.

As illustrated in FIG. 4, illuminated element 425 may be wider than fiber optic panels 440 in certain embodiments. For various lighting effects, windows 430 may be equipped with optical components, representatively illustrated at optical component 435 that distribute the light from fiber optic panels 440 in a particular way. For example, optical component 435 may include optical scatter points (prismatic elements, for example) that cause the light to be distributed evenly over illuminated element 425. As described below with reference to FIG. 8, other optical components may be used with embodiments of the invention to produce other lighting effects.

Figure 5:
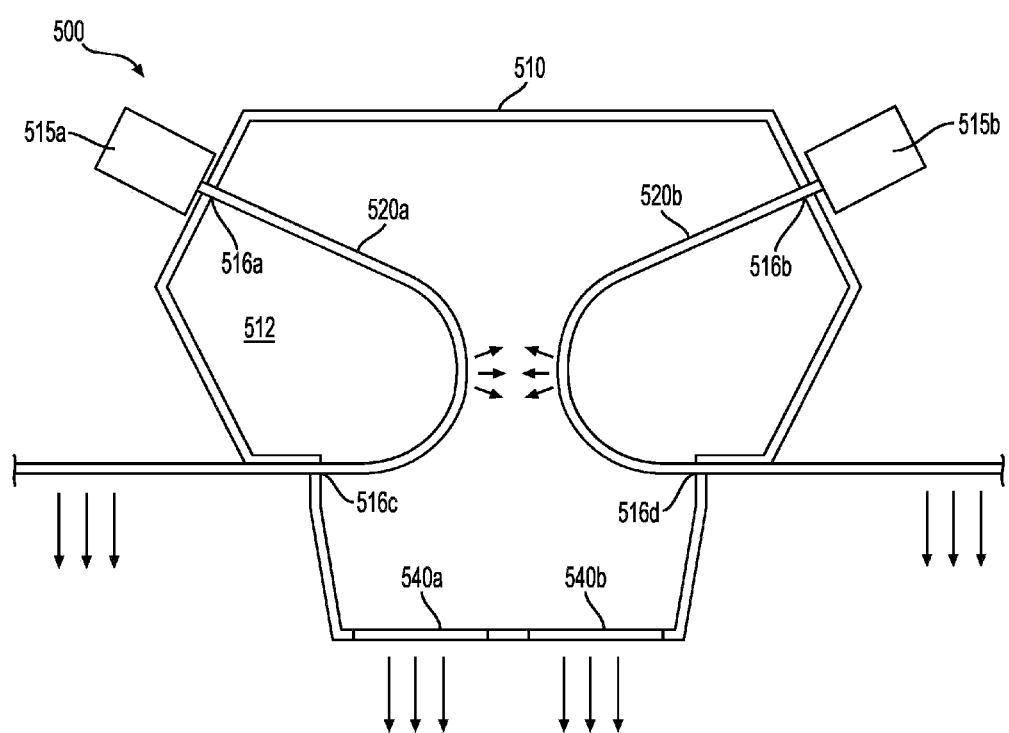
FIG. 5 is a cross-sectional diagram of an applique with which the present invention can be embodied.

FIG. 5 is a cross-sectional diagram of an example applique 500 with which the present invention can be embodied. Applique 500 may include a housing 510 having an internal chamber 512. Chamber 512 is sufficiently deep to accommodate the width of fiber optic panels 520a and 520b, representatively referred to herein as fiber optic panel(s) 520. Example housing 510 has one or more windows 540a and 540b, representatively referred to herein as window(s) 540, formed therein through which light from fiber optic panels 520 is communicated externally to housing 510. As indicated above, windows 540 may form a logo or other aesthetic element.

Applique 500 may include light sources 515a and 515b, representatively referred to herein as light source(s) 515, coupled to fiber optic panels 520. In certain embodiments, light from light sources 515 is also communicated to internal chamber 512 so that light through windows 540 includes light from fiber optic panels 520 and light directly from light sources 515.

As illustrated in FIG. 5, the illumination regions of fiber optic panels 520 are disposed in internal chamber 512 along a folded or curved path. Fiber optic panels 520 may be introduced to internal chamber 512 through openings 516a and 516b and may exit internal chamber 512 through openings 516c and 516d. Fiber optic panels 520 may exit internal chamber 512 in opposing directions such that the external portions of fiber optic panels 520 can be used for lighting.

As illustrated in FIG. 5, fiber optic panels 520 may illuminate internal chamber 512, and the light in internal chamber 512 may be reflected or otherwise conveyed through windows 540. Light may also be emitted from fiber optic panels 520 externally of housing 510, which may be used for both functional and aesthetic lighting applications. In the illustrated embodiment, the illumination regions of fiber optic panels 520 are positioned both internally and externally to housing 510.

Figure 6:
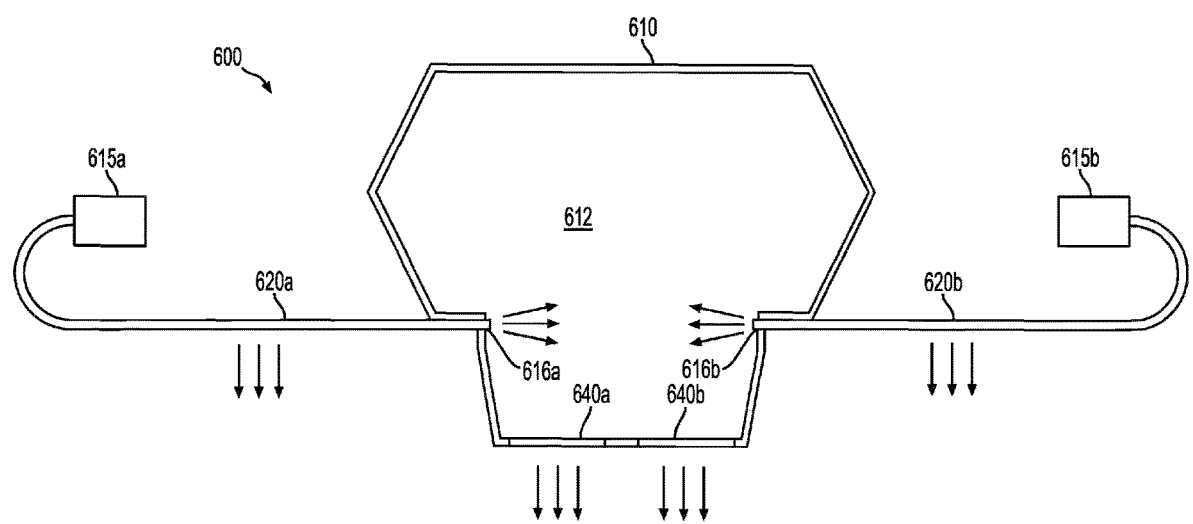
FIG. 6 is a cross-sectional diagram of another applique with which the present invention can be embodied.

FIG. 6 is a cross-sectional diagram of an example applique 600 with which the present invention can be embodied. Applique 600 may include a housing 610 having an internal chamber 612. Chamber 612 is sufficiently deep to accommodate the width of fiber optic panels 620a and 620b, representatively referred to herein as fiber optic panel(s) 620. Example housing 610 has one or more windows 640a and 640b, representatively referred to herein as window(s) 640, formed therein through which light from fiber optic panels 620 is communicated externally to housing 610. As indicated above, windows 640 may form a logo or other aesthetic element.

Applique 600 may include light sources 615a and 615b, representatively referred to herein as light source(s) 615, coupled to fiber optic panels 620. Light from light sources 615 is conveyed through fiber optic panels 620 and some of that light is emitted transversely therefrom, e.g., at the illumination region thereof, along its route to housing 610. This light can be used for functional and/or aesthetic lighting. The distal ends of fiber optic panels 620 may extend into housing 610 through openings 616a and 616b by which light from the distal ends of fiber optic panels 620 is provided to internal chamber 612. The light in internal chamber 612 may be reflected therein and ultimately emitted from windows 640.

Figure 7:
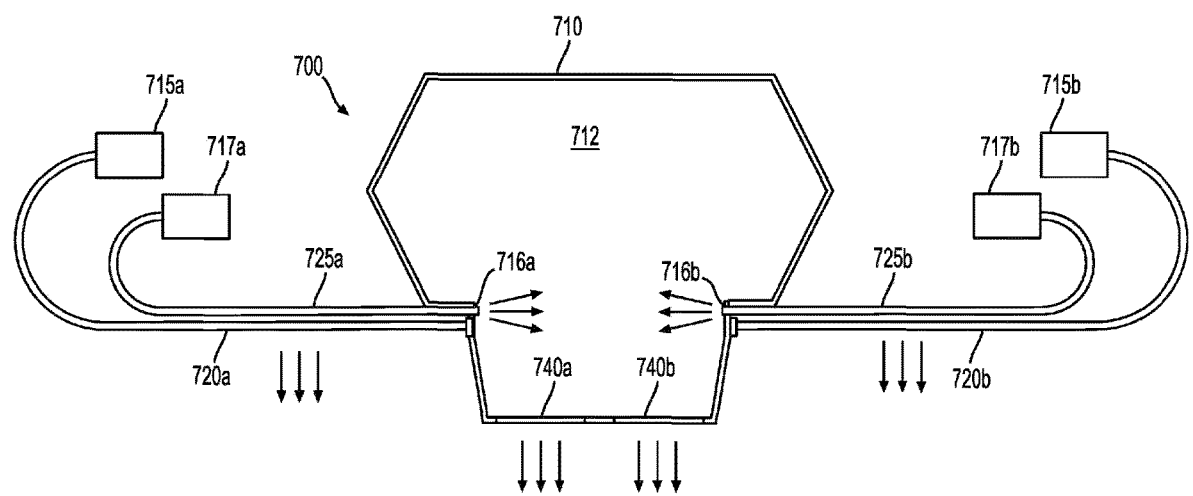
FIG. 7 is a cross-sectional diagram of another applique with which the present invention can be embodied.

FIG. 7 is a cross-sectional diagram of an example applique 700 with which the present invention can be embodied. Applique 700 may include a housing 710 having an internal chamber 712. Example housing 710 has one or more windows 740a and 740b, representatively referred to herein as window(s) 740, formed therein through which light from internal chamber 712 is communicated externally to housing 710. As indicated above, windows 740 may form a logo or other aesthetic element.

Applique 700 may include a plurality of light sources 715a and 715b, representatively referred to herein as light sources 715, and light sources 717a and 717b, representatively referred to herein as light sources 717. Light sources 715 may be optically coupled to respective fiber optic panels 720a and 720b, representatively referred to herein as fiber optic panels 720, and light sources 717 may be optically coupled to respective fiber optic panels 725a and 725b, representatively referred to herein as fiber optic panels 725. In certain embodiments, light sources 715 provide light that is a color other than that provided by light sources 717. For example, light emitted from light sources 715 and conveyed through fiber optic panels 720 may be red, while light emitted from light sources 717 and conveyed through fiber optic panels 725 may be blue. Other colors may be used as well without departing from the spirit and intended scope of the present invention.

In certain embodiments of the invention, fiber optic panels 720 may be of a construction other than that of fiber optic panels 725. For example, fiber optic panels 720 may be treated to emit light transversely to the optical axes of its fibers, such as at their respective illumination regions, while fiber optic panels 725 may receive no such treatment and are thus void of such illumination regions. Additionally, the distal ends of fiber optic panels 720 may be passivated or otherwise blocked to prevent light from escaping from those ends, while the distal ends of fiber optic panels 725 may be configured to allow light to escape. The distal ends of fiber optic panels 725 may extend into internal chamber 712 through openings 716a and 716b in housing 710, while the distal ends of fiber optic panels 720 may be terminated at housing 710. When so constructed, applique 700 comprises multi-color features, where the transversely emitted light from fiber optic panels 720 may be one color, e.g., red, and the light emitted from windows 740 of housing 710 may be another color, e.g., blue.

Figure 8:
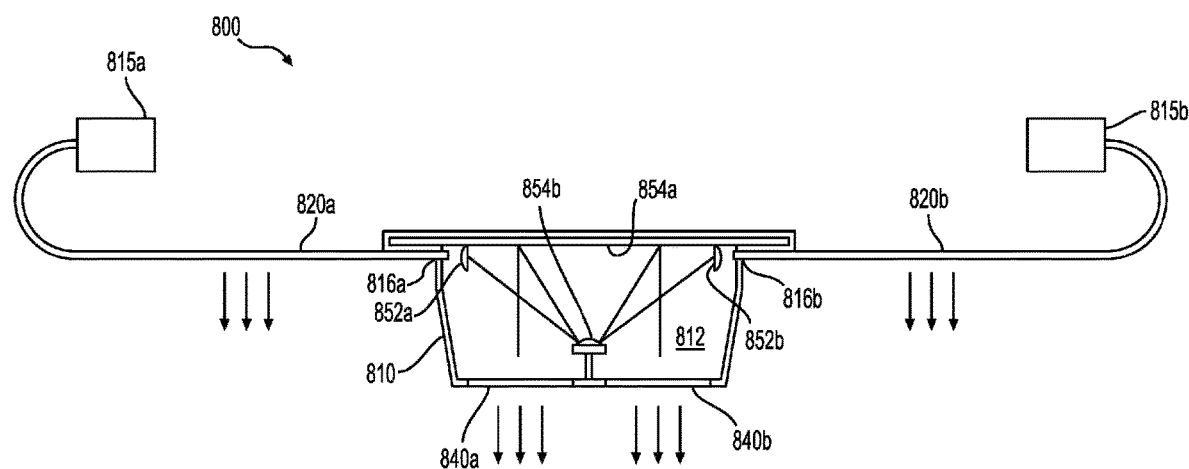
FIG. 8 is a cross-sectional diagram of another applique with which the present invention can be embodied.

FIG. 8 is a cross-sectional diagram of an example applique 800 with which the present invention can be embodied. Applique 800 may include a housing 810 having an internal chamber 812. Chamber 812 is sufficiently deep to accommodate the width of fiber optic panels 820a and 820b, representatively referred to herein as fiber optic panel(s) 820. Example housing 810 has one or more windows 840a and 840b, representatively referred to herein as window(s) 840, formed therein through which light from fiber optic panels 820 is communicated externally to housing 810. As indicated above, windows 840 may form a logo or other aesthetic element.

Applique 800 may include light sources 815a and 815b, representatively referred to herein as light source(s) 815, coupled to fiber optic panels 820. Light from light sources 815 is conveyed through fiber optic panels 820 and some of that light is emitted transversely therefrom, e.g., at the illumination region thereof, along its route to housing 810. This light can be used for functional and/or aesthetic lighting.

The distal ends of fiber optic panels 820 may extend into housing 810 through openings 816a and 816b so that light from the distal ends of fiber optic panels 820 is provided to optical system 850 disposed in internal chamber 812. Optical system 850 may comprise one or more refractive elements, such as lenses 852a and 852b, representatively referred to herein as lens(es) 852, one or more reflective elements, such as reflectors 852a and 852b, representatively referred to herein as reflector(s) 852, and other optical elements whereby light emitted from fiber optic panels 820 is processed for distribution over windows 840. Optical processing performed by optical system 850 may include filtering, polarizing, image projecting, and so on, and will vary by application.

The embodiments described above demonstrate different configurations and operational modes that can be combined or interchanged in other embodiments of the invention. Upon review of this disclosure, those having skill in the art will recognize and appreciate various configurations and operational modes that can be realized in embodiments of the present invention without departing from the spirit and intended scope thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. An automotive lighting apparatus using fiber optics comprising:

a number of optical fibers grouped together into a number of fiber optic bundles;

a housing assembly configured to provide the fiber optic bundles through the housing assembly, the fiber optic bundles formed into different shapes with a number of fiber optic panels;

a number of light sources optically coupled to a number of distal ends of said fiber optic bundles that are configured to communicate light through said number of optical fibers;

a driver circuitry configured to power or provide sufficient electrical current to said light sources where each fiber optic panel is configured to perform a lighting function of an automotive vehicle;

the number of fiber optic panels each optically coupled to a respective fiber optic bundle, the fiber optic panels optically coupled to the housing assembly;

each fiber optic panel configured to communicate a conveyed light into an internal chamber of the housing assembly and to communicate a portion of the conveyed light to a number of illumination regions that extend from the housing assembly in at least two opposing directions, which are configured to perform a number of lighting functions.

2. The apparatus of claim 1, where each fiber optic panel is disposed on a backing and overlaid with an optically transmissive medium and an optically reflective medium that opposes the backing, with optical fibers located between the transmissive and reflective mediums.

3. The apparatus of claim 1, where some portion of the conveyed light is configured to emit light from a distal end of the fibers; and where another portion of conveyed light is configured to emit light transversely relative to an optical axis of the respectively associated fiber optic panel.

4. The apparatus of claim 1, wherein the light sources are mounted to the housing assembly and configured to illuminate an internal chamber thereof.

5. The apparatus of claim 1, where at least one lighting function represents a taillight function or an auxiliary function.

6. The apparatus of claim 1, wherein the distal ends of the fiber optic panels are optically coupled to an optical system containing at least one reflective element or at least one refractive element, some of the conveyed light from the internal chamber being directed outside the apparatus.

7. The apparatus of claim 1, wherein the illumination regions at a number of locations between the light sources and the distal ends of the fiber optic panels are configured to perform a number of lighting functions.

8. The apparatus of claim 1, wherein the fiber optic panels comprise:

a set of fiber optic panels having the illumination regions formed thereon and another set of fiber optic panels that are void of the illumination regions, the distal ends of said set being configured to prevent a light emission therefrom, the distal ends of another set of fiber optics configured to allow a light emission therefrom;

the illumination regions of the set of fiber optic panels extending from the housing assembly configured to perform lighting functions, the distal ends of the other set extending into the housing assembly to convey light emission into the internal chamber thereof.

9. The apparatus of claim 8, wherein a number of light sources coupled to the set of fiber optic panels emits a color of light different than any of the remaining number of light sources coupled to the other set of fiber optic panels.

10. The apparatus of claim 1, wherein the lighting function is an automotive tail light function.

11. The apparatus of claim 1, wherein the lighting function is an aesthetic lighting function different from the automotive tail light function.

12. The apparatus of claim 1, wherein the light sources include light emitting diodes.

13. An automotive vehicle comprising the apparatus of claim 1 that includes:

a number of optical fibers grouped together into a number of fiber optic bundles;

a housing assembly configured to provide the fiber optic bundles through the housing assembly, the fiber optic bundles formed into different shapes with a number of fiber optic panels;

a number of light sources optically coupled to a number of distal ends of said fiber optic bundles that are configured to communicate light through said number of optical fibers;

a driver circuitry configured to power or provide sufficient electrical current to said light sources where each fiber optic panel is configured to perform a lighting function of an automotive vehicle;

the number of fiber optic panels each optically coupled to a respective fiber optic bundle, the fiber optic panels optically coupled to the housing assembly;

each fiber optic panel configured to communicate a conveyed light into an internal chamber of the housing assembly and to communicate a portion of the conveyed light to a number of illumination regions that extend from the housing assembly in at least two opposing directions, which are configured to perform a number of lighting functions.

14. The vehicle of claim 13, where the light sources are mounted to the housing assembly and configured to illuminate an internal chamber thereof.

15. The apparatus of claim 13, wherein the illumination regions of the fiber optic panels located between the housing assembly and distal ends of the fiber optic panels are configured to perform a number of lighting functions.

* * * * *